Oct. 23, 1962 T. H. GRAU 3,059,566
HOPPER ATTACHMENT FOR A FORAGE HARVESTER
Filed Jan. 15, 1960 4 Sheets-Sheet 1
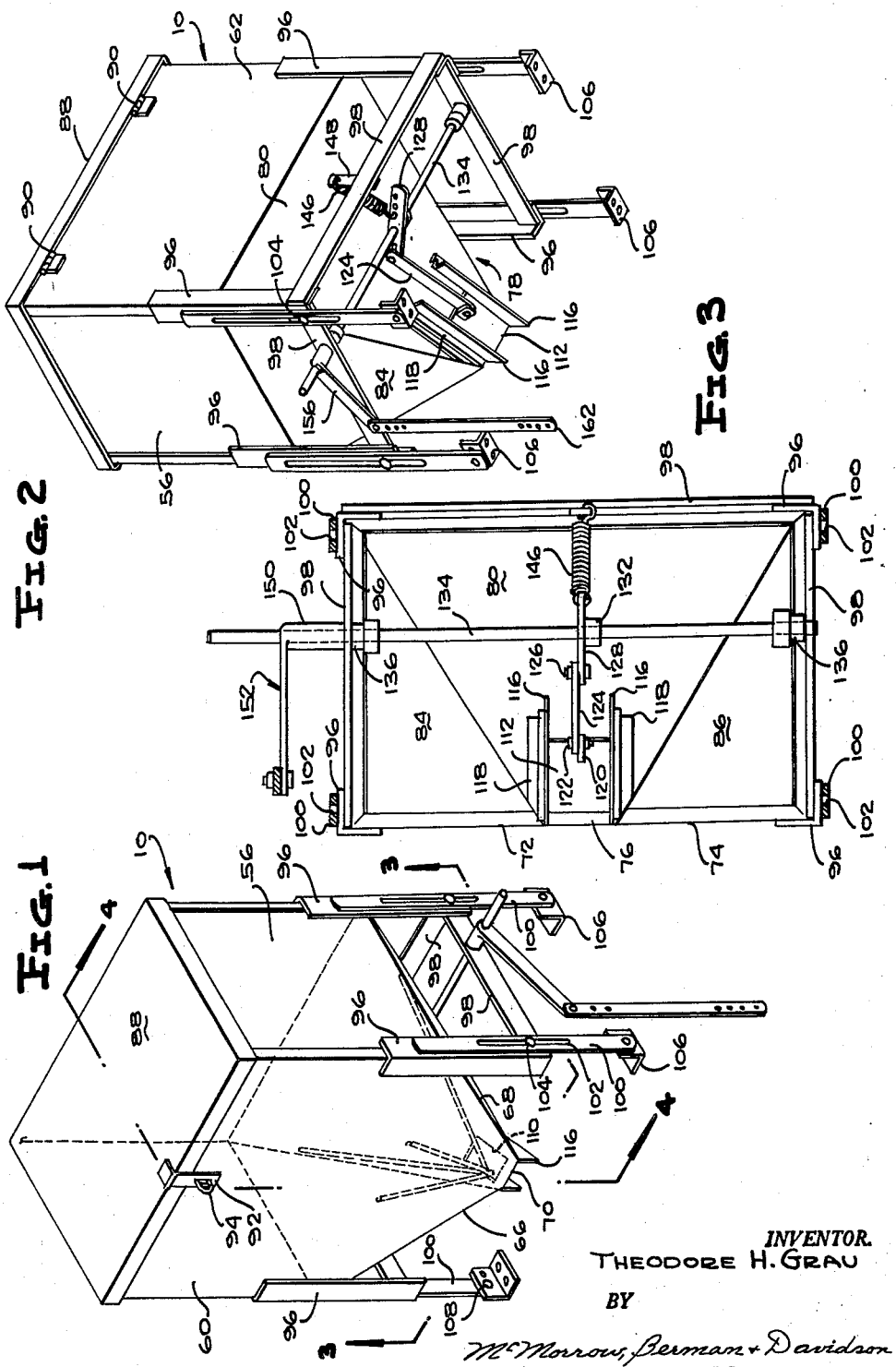
INVENTOR.
THEODORE H. GRAU
BY
McMorrow, Berman & Davidson
ATTORNEYS Oct. 23, 1962 T. H. GRAU 3,059,566
HOPPER ATTACHMENT FOR A FORAGE HARVESTER
Filed Jan. 15, 1960 4 Sheets-Sheet 2
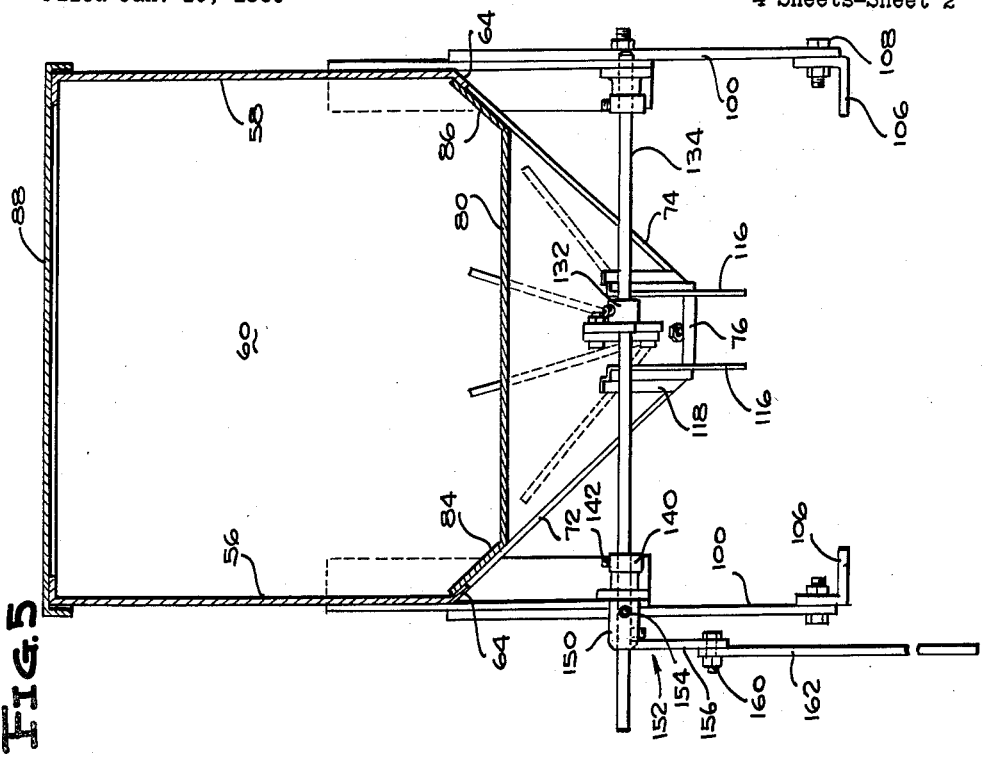
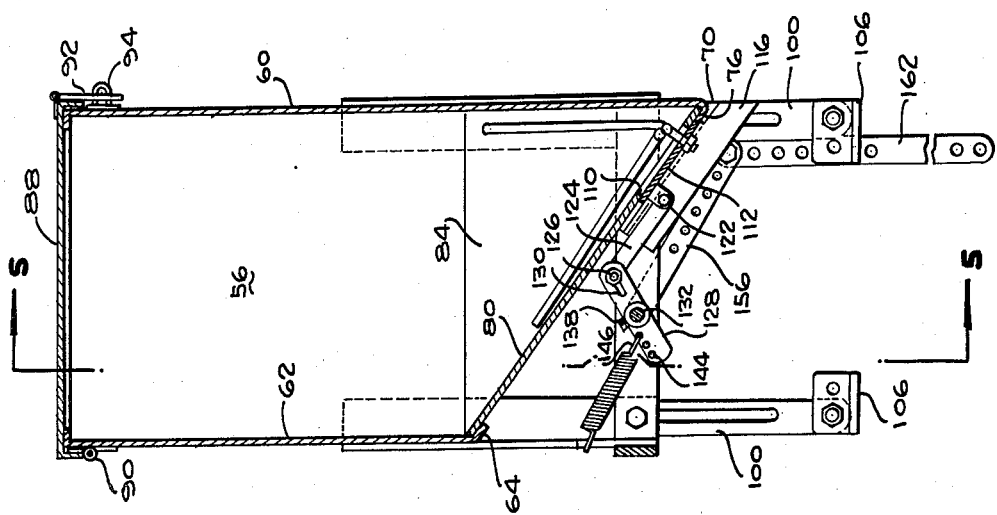
INVENTOR.
THEODORE H. GRAU
BY
McMorrow, Berman & Davidson
ATTORNEYS Oct. 23, 1962 T. H. GRAU 3,059,566
HOPPER ATTACHMENT FOR A FORAGE HARVESTER
Filed Jan. 15, 1960 4 Sheets-Sheet 3

INVENTOR.
THEODORE H. GRAU
BY McMorrow, Berman & Davidson
ATTORNEYS

Oct. 23, 1962 T. H. GRAU 3,059,566
HOPPER ATTACHMENT FOR A FORAGE HARVESTER
Filed Jan. 15, 1960 4 Sheets-Sheet 4
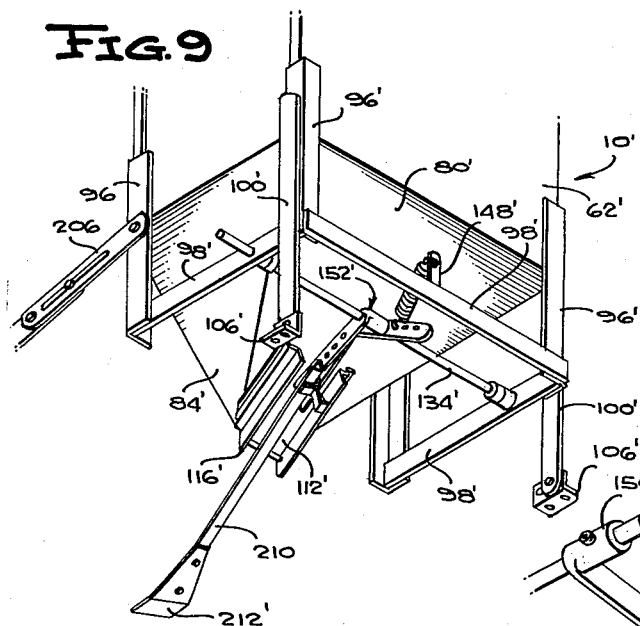
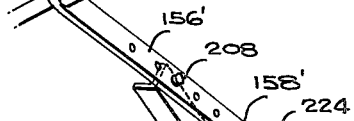
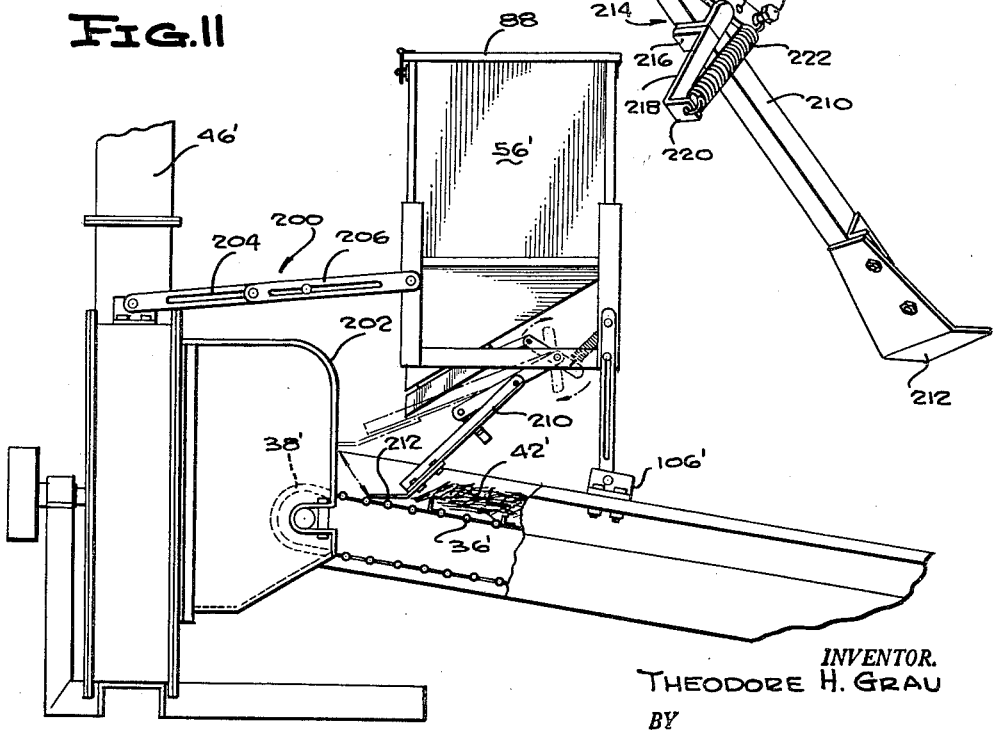
INVENTOR.
THEODORE H. GRAU
BY
McMorrow, Berman & Davidson
ATTORNEYS

United States Patent Office 3,059,566
Patented Oct. 23, 1962

3,059,566
HOPPER ATTACHMENT FOR A FORAGE HARVESTER
Theodore H. Grau, Albert City, Iowa
(Rembrandt, Iowa)
Filed Jan. 15, 1960, Ser. No. 2,669
3 Claims. (Cl. 99—235)

This invention relates to the general class of hopper devices or material feed means and, more specifically, the instant invention pertains to a hopper attachment or feeder device for connection with a conventional forage harvester or field chopper, the hopper being especially designed to supply the forage with a preservative or additive material of the generally granular or flocculent type.

It is a well known fact that modern farmers are now applying a preservative or additive material of one kind or another to their forage. However, a major problem, until the instant invention, resided in the lack of means for applying the preservative or additive properly to the forage. According to prior art teachings, some farmers have applied the additive by hand by scattering the same on the forage load or in the silo itself. It is known that there have been some attempts to supply the additive to the forage by mechanical means. However, and regardless of the method and means heretofore devised and employed, the preservative or additive material was unevenly distributed among the forage which, of course, constitutes wasted additive, and the lack of proper distribution of the additive to the forage leads to poor results.

It is, therefore, one of the primary objects of this invention to provide a mechanical device in the nature of a hopper or feeder means attachment for connection with conventional forage harvesters and related farm equipment, the attachment insuring that the additive or preservative materials will be evenly distributed on every particle of forage in the correct proportions and without waste.

Another object of this invention is to provide a hopper attachment for distributing additive materials to forage, the device including means for metering the flow of the additive therefrom in response to the volume of unchopped forage being fed into the blower of a silo loader or field chopper.

A further object of this invention is to provide a hopper for conventional forage harvesting machines, the hopper attachment being especially designed to hold a preservative or additive material for distribution in the forage, and wherein the attachment is provided with metering means responsive to the volume of flow of the forage material through the harvester and wherein the control means for the metering means is new and unique.

It is a still further object of this invention to provide a hopper type dispenser for preservatives or additives to forage, the dispenser being adapted to discharge the additive therefrom repetitively and in such a manner as to prevent any packing or bridging of the additive within the dispenser thereby maintaining the free-flow characteristic of the material whereby a high degree of operating efficiency is achieved.

This invention contemplates, as a still further object thereof, the provision of a hopper or feeder means attachment for distributing preservatives or additive materials to forage, the attachment being inexpensive to manufacture and maintain, non-complex in construction and assembly, and durable in use.

Other and further objects and advantages of this invention will become more evident from a consideration of the following specification when read in conjunction with the annexed drawings, in which:

FIGURE 1 is a perspective view of a hopper or feeder attachment for a forage harvester as seen from above and at the front side and one end thereof;

FIGURE 2 is a perspective view of the hopper or feeder attachment for a forage harvester as shown in FIGURE 1, FIGURE 2 illustrating details of construction as seen from below and at the rear side and other end thereof;

FIGURE 3 is a bottom plan view of the hopper or feeder attachment as shown in FIGURES 1 and 2, FIGURE 3 being taken on substantially the horizontal plane of line 3—3 of FIGURE 1, looking in the direction of the arrows;

FIGURE 4 is a vertical medial cross-sectional view of the hopper or feeder attachment shown in FIGURES 1 and 2, FIGURE 4 being taken on the vertical plane of line 4—4 of FIGURE 1, looking in the direction of the arrows and showing the valve or metering means in its closed position;

FIGURE 5 is a vertical detail longitudinal cross-sectional view taken substantially on the line 5—5 of FIGURE 4, looking in the direction of the arrows;

FIGURE 9 is a bottom perspective view of the hopper or feeder device, illustrating a side and one end thereof, and showing a modification of the valve control or metering means;

FIGURE 10 is an enlarged fragmentary perspective view of a portion of the valve control means shown in FIGURE 9; and, FIGURE 11 is a side elevational view of the second embodiment of this invention, FIGURE 11 illustrating the hopper or feed means as attached to a conventional forage blower.

Figure 6:
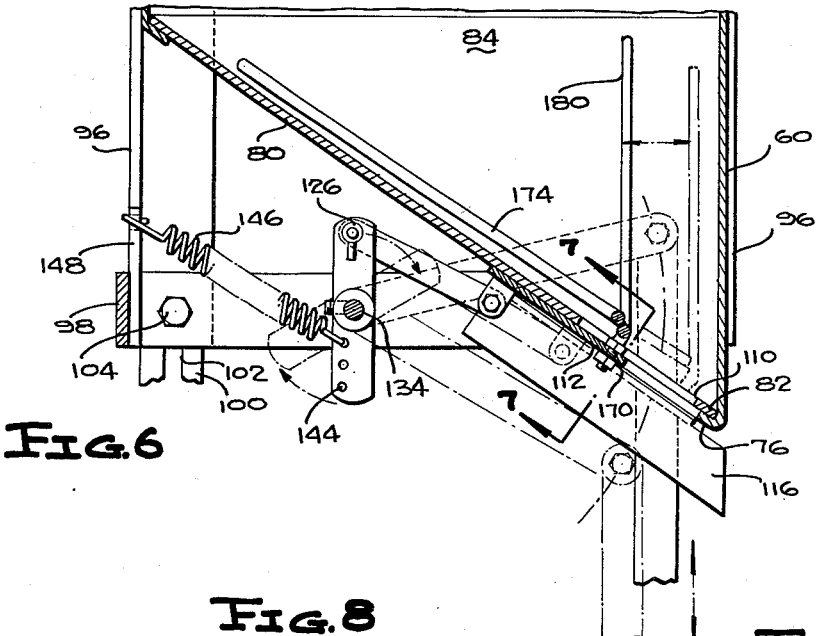
FIGURE 6 is an enlarged fragmentary detail cross-sectional view similar to FIGURE 4, but showing the valve or metering means in its open position.

By way of introduction, and prior to the description of the instant invention, it should be pointed out that modern farmers generally employ one of two procedures in applying additives to the forage material. Some farmers prefer to chop their hay or other forage material and apply the additive in the field in one operation. On the other hand, other farmers prefer to chop the material and bring it to the silo or other place where it is to be stored, and then apply the additive or preservative.

In the first use of the hopper described below, the same is utilized as an attachment for a forage harvester, sometimes called a field chopper. The hay or corn or grass or other material is chopped by the harvester, but prior to the chopping operation, the additive or preservative is added to the forage before the same is chopped and blown into a wagon or other device which trails the harvester.

With reference to the second usage of the invention as is illustrated in FIGURES 9 to 11, inclusive, the forage material has already been chopped in the field and is now ready to be blown into a silo or stack. For various reasons, farmers have sometimes preferred to apply an additive or preservative at this latter stage of the operation rather than in the field at the time the material is chopped. In this case, the hopper attachment to which this invention pertains may be fixed to a stationary type of blower so that as the chopped forage material passes into the blower, the preservative or additive can be supplied.

Thus, in the following specification, reference numeral 10 designates, in general, a hopper or feed means attachment for a conventional forage harvester 12, the hopper 10 being designed especially to hold preservatives or additives to the forage. The harvester 12 includes, as conventional component elements thereof, and to which no claim of novelty is directed herein, a suitable frame or chassis 14 including oppositely disposed end walls 16 (only one being shown). The chassis 14 is suitably supported on wheels 18, only one of which is illustrated. Supported for rotation between the side walls 16 is a conventional packer wheel 20 ahead of which are disposed a push roller 22 and a packing roller 24. The push roller 22 and packing roller 24 are supported together on a suitable frame which includes a pair of oppositely disposed bracket arms 26 (only one being illustrated) in which the opposed ends of the shafts 28, 30 of the push roller 22 and packing roller 24 are journalled for rotation, respectively. Any suitable type of bearing blocks (not shown) are mounted for free reciprocation within the vertical slots 32, 34 formed in each side wall 16, the slots 32, 34 in the opposed side walls being disposed in confronting relation relative to each other, and these bearing blocks receive the extreme outer ends of the shafts 28, 30 and serve as journals therefor. Universal driving means connect with the shafts 28, 30 and the shaft (not shown) of the packer wheel 20 to drive the latter, the push roller 22 and the packing roller 24 in the directions indicated by the arrows shown in FIGURE 8 of the drawings.

Disposed below the packer wheel 20 and the push roller 22 is a power driven conveyor belt 36 suitably supported on rollers 38 (only one being shown). Ahead of the uppermost roller 38 and below the packing roller 24 is an idler roller 40.

Reference numeral 42 denotes forage which is carried upwardly below the packer wheel 20 and the push roller 22. The forage 42 is discharged for movement between the rollers 24 and 40 and is expelled from therebetween into a conventional blower 44 having a discharge spout 46.

From the foregoing description it should be now obvious that as the thickness of the forage varies, the axles 28, 30 and consequently the push roller 22 and packing roller 24 will reciprocate relative to the slots 32, 34.

Depending from the bracket arms 26 adjacent the opposed ends thereof are a pair of rods 48, 50 which reciprocate through a suitably apertured frame member 52 and carry on their lower ends a tie plate 54. Surrounding the lower ends of the rods 48, 50 and interposed between the frame members 52 and plate 44 are helicoidal springs 55 which constantly bias the push roller 22 and packing roller 24 for vertical movement downwardly.

The hopper or feed means 10 to which this invention is directed is seen to include a pair of oppositely disposed, longitudinally extending end walls 56, 58 substantially rectangular in configuration and of the same dimensions, and a pair of elongated substantially rectangular front and rear walls 60, 62, respectively, of which the former has a vertical dimension larger than the latter. The lower ends of the end walls 56, 58 and the rear wall 62 are provided with a continuous horizontal inwardly extending flange 64.

The lower end of the front wall 60 is formed with downwardly and inwardly converging edges 66, 68 (see FIGURE 1) which merge with a horizontal lower edge 70, the edges 66, 68 and 70 being turned inwardly to form continuous integral downwardly converging side flanges 72, 74, and a horizontal end flange 76. As is seen in the drawings, that portion of the flange 64 which projects inwardly from the rear wall 56 is disposed in spaced, confronting and parallel relation with respect to the flange 76.

Reference numeral 78 designates, in general, the bottom wall of the hopper 10, the bottom wall comprising a centrally disposed substantially triangular panel 80 having a truncated apex end 82 and a pair of oppositely disposed substantially right triangular side panels 84, 86 which diverge outwardly from the longitudinally extending marginal edges of the central panel 80. The base and apex ends of the panel 80 are supported, respectively, on that portion of the flange 64 which projects inwardly from the rear wall 62 and the flange 76. The marginal edges adjacent the base ends of the side panels 84, 86 are supported on the flanges 72, 74, respectively, and the marginal edges of their respective altitude sides are supported on those portions of the flange 64 which project from the end walls 56, 58.

The open upper end of the hopper 10 is closed by a top wall 88 hingedly connected at 90 to the rear wall 62, and which is provided at its front end with a hasp 92 adapted to releasably engage a staple 94.

Each corner of the hopper 10 is received within reinforcing angle iron elements 96 which depend below the lower edges of the end walls 56, 58 and the rear wall 60. The adjacent pairs of angle iron elements 96 are rigidly connected together by braces 98 fixedly secured thereto and extending therebetween except at the front side of the hopper 10.

Adjustable elongated substantially rectangular standards 100 depend from each angle iron element 96 and are slotted longitudinally at 102 to receive therethrough bolts 104 for adjustable connection with the angle irons 96. The lower ends of the standards terminate in shoes 106 connected adjustably thereto by bolts 108. The shoes 106 are connected by conventional means to the chassis frame members of the harvester 12 above the push roller 22 and the roller 24, the harvester 12 being open through at least this section. The panel 80, adjacent its lower truncated end 82 is provided with a transversely extending, substantially rectangular material discharge opening 110, see FIGURES 1, 6 and 7, which may be alternately open and closed by means of a substantially rectangular closure member 112 that reciprocates thereacross adjacent the underside of the panel 80, the closure member 112 being slidable within confronting slide tracks or grooves 114 formed in a pair of laterally spaced substantially parallel elongated and rectangular spout forming side walls 116, the side walls 116 each having a laterally offset flange 118 fixedly secured to the panel 80.

The closure member 112 has fixedly secured to the upper end a depending lug 120 to which is pivotally connected at 122 one end of a link 124, the other end of the latter being pivotally connected at 126 to one end of a link 128 slotted longitudinally at 130. The link 128 is integral with a hub 132 through which extends a shaft 134, the opposed ends of which are journalled in bosses 136 which project inwardly from each of the braces 98 disposed adjacent the opposed ends of the hopper 10. A set screw 138 fixedly secures the hub 132 of the link 128 to the shaft 132. Stop collars 140 are mounted on the shaft 134 adjacent each of the bosses or journals 136 and are secured thereon by means of set screws 142, the stop collars 140 being adapted to prevent the shaft 134 from moving or shifting axially.

The link 128 is provided with a plurality of apertures or openings 144 in the other end thereof, the openings being adapted to selectively receive one end of a helicoidal spring 146, the other end of the helicoidal spring 146 being anchored to one end of an upright tab 148, the other end of the tab 148 being fixedly secured to that brace 98 which extends across the rear of the hopper 10.

As is clearly seen in the several figures of the drawings, the hub 150 of a crank 152 is fixedly secured to the shaft 134 by means of a set screw 154. The crank 152 includes a crank arm 156 having a plurality of selective adjustment openings extending transversely therethrough along the longitudinal axis thereof. The other end of the arm 156 is pivotally connected at 160 to a lever 162 having a plurality of openings 164 extending transversely therethrough at one end thereof and a second series of openings 166 which extend transversely therethrough adjacent its other end.

Figures 7, 8:
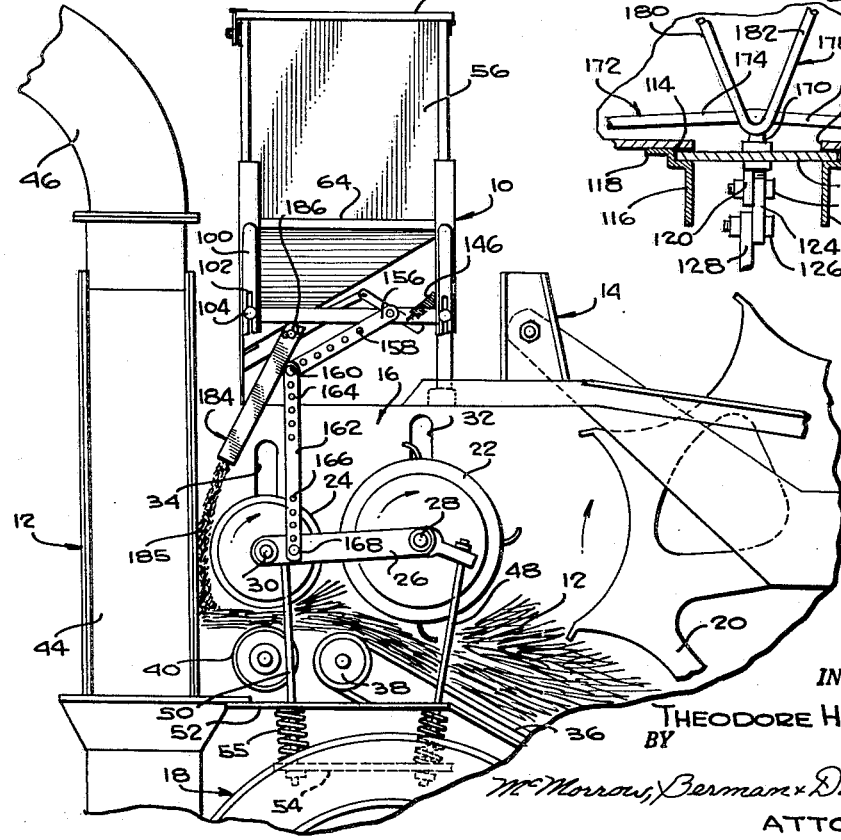
FIGURE 7 is an enlarged detail fragmentary cross-sectional view taken substantially on the inclined plane of line 7—7 of FIGURE 6, looking in the direction of the arrows.
FIGURE 8 is a partial side elevational view of a conventional harvester, one side thereof being removed, and illustrating the modus operandi of one embodiment of the hopper or feed means as attached thereto.

Referring now more specifically to FIGURE 8 of the drawings, it is seen that the other end of the lever 162 is fixedly secured at 168 to one of the bracket arms 26.

A stud bolt 170 extends through and is rigidly connected with the lower end of the closure member 112, the stud bolt 170 having fixedly secured thereto the apex end of a substantially V-shaped agitator member 172 having diverging arms 174, 176 which extend over the central panel 80, and the apex end of a second V-shaped agitator member 178 is also fixedly connected to the stud bolt 170, the agitator member 178 having normally upright arms 180, 182.

Reference numeral 184 designates a substantially U-shaped discharge chute adjustably connected at 186 to the side walls 116, the means 186 permitting the additive material 185 to be discharged at a desired point forwardly of the roller 24.

From the foregoing description, the operation of the apparatus involved in the instant invention is deemed to be self-evident. Assuming that the hopper 10 is mounted on the harvester 12 and that forage 42 is being fed to push roller 22 and the packing roller 24, the last two named elements will reciprocate vertically depending upon the volume of forage passing therebelow. As the forage 42 increases in thickness, the bracket arms 26 will move upwardly and this motion is transmitted to the lever 162 which in moving upwardly causes the crank arm 156 to rotate in a clockwise direction, reference being made specifically to FIGURE 8 of the drawings, and since the crank arm 156 is fixedly secured to the shaft 134, the latter will also turn in the same direction. This rotary movement is transmitted to the link 128 turning the same in a clockwise direction to cause the link 124 to move upwardly and draw the closure member 112 in a corresponding direction and away from the discharge opening 110. It is, of course, understood that the hopper 10 has been previously filled with a preservative or additive material.

The degree of movement of the closure member 112 is, of course, determined by the height of movement of the arms 26. The preservative or additive material falls through the discharge opening 110 into the discharge chute 184 in amounts controlled in the manner described above.

As the volume of the uncut forage 42 or the thickness thereof below the push roller 22 and the packing roller 24 diminishes, the arms 26 will of course move downwardly and effect a reverse movement of the several component elements described above and connected with the closure member 112. The helicoidal spring 146, connected with the link 128, exerts its force to insure the downward movement of the closure member 112 into its closed position, as shown in FIGURE 4.

Now as the closure member 112 reciprocates, the agitator means 172, 178 will move therewith and engage against and prevent the additive or preservative material from packing and/or bridging, thereby insuring that the material will flow freely through the discharge opening 110.

It will be understood, of course, that the unchopped forage 42 passes into the blower 44 wherein the same is chopped and is discharged through the spout 46 into a trailing wagon or other similar conveyance.

FIGURES 9 to 11, inclusive, disclose a second embodiment of this invention. Elements of this second embodiment finding counterparts in the original form of the invention have been assigned the same reference numerals to which a prime mark has been added to effect differentiation therebetween.

Essentially, the basic changes in construction in the second embodiment of the invention reside in the operating linkage for the closure member of the hopper discharge opening and a slightly different supporting structure for the hopper.

Reference numeral 200 designates a conventional stationary blower for forage and other materials, the blower 200 being open adjacent its upper forward end, as before, and in this instance, the chopped forage 42' is carried upwardly on a conveyor belt 36' trained around a roller 38' disposed within the casing 202 of the blower 200, having a discharge stack 46'.

In this case, the hopper or feed device 10' is supported on the chassis frame or side walls of the blower 200 by means of the standards 100' and shoes 106' at the rear of the hopper 10' in the same manner as described above. However, the standards at the front of the hopper 10' as originally described have been omitted in the second embodiment, and connection is made between the angle irons 96' at the front of the hopper 10' with the blower 200 by means of the adjustable links 204, 206.

In this embodiment of the invention, the crank 152' has been moved inwardly on the shaft 134' to a point substantially centrally of its opposed ends. To the lower depending end of the crank arm 156' is pivotally connected, through a pivot pin 208, to one end of an angle member 210. To the other or free end of the angle member 210 is connected a shoe 212 which is adapted to ride directly on the conveyor belt 36' in the absence of any forage 42' below the shoe 212.

To the upper end of the angle member 210 and adjacent the pivot pin 208 is connected a substantially T-shaped bracket 214, the stem 216 of which is rigidly secured to the angle member 210. As is clearly seen in FIGURE 10 of the drawings, a portion of the cross head 218 of the bracket 214 extends along one side of the angle member 210 in laterally spaced relation relative thereto, and that the lower end of the cross head 218 terminates in an offset flange 220 to which is anchored one end of a helicoidal spring 222. The other end of the helicoidal spring is connected to a stud bolt 224 which is selectively carried in one of the openings or apertures 158' formed in the crank arm 156'.

Referring now more specifically to FIGURES 10 and 11 of the drawings, it will be seen that the helicoidal spring 146' constantly biases the crank arm 156' for movement downwardly towards the stem 216 against which the same may, under certain conditions, engage to limit further rotation thereof together with the shaft 134'.

The operation of this second embodiment of the invention is as follows:

When no chopped forage 42' is passing under the shoe 212, the latter rides on the conveyor belt 36' and the valve or closure member 112' is in its closed position. Now, however, as the chopped forage 42' passes beneath the shoe 212, the latter is elevated and pivots upwardly about the pivot pin 208 until the stem 216 engages the lower end of the crank arm 156'. Continued upward movement of the shoe 212 causes the crank arm 156' to rotate in a clockwise direction, reference being made to FIGURES 9 and 11, and since the crank arm 156' is rigidly connected to the hub 150' with the shaft 134' the shaft 134' will rotate in the same direction thereby effecting an opening of the closure member 112'.

As the volume of the forage 42' diminishes, under the shoe 212, the same will lower and the spring 146' imparts a reverse direction to the shaft 134' effecting closure of the closure member 112'.

It will be understood that the chopped forage together with the additive is discharged through the spout 46' into a silo.

It is thus seen that in both embodiments of this invention, the additive material disposed within the hoppers 10, 10' will be distributed evenly and throughout the chopped or unchopped forage 42, 42' in response to the volume thereof which passes over the conveyors for eventual discharge into the blowers 44, 200.

Having described and illustrated two embodiments of this invention, it will be understood that the same are offered merely by way of example, and that this invention

What is claimed is:

1. In combination, a forage harvester having a blower mechanism, an endless belt forage conveyor discharging at one end into said blower mechanism, a supporting frame for said conveyor including a pair of oppositely-disposed side walls, a hopper mounted on said frame over said conveyor and having a discharge opening disposed over and proximate to said discharge end of said conveyor, a closure member mounted for reciprocation across said discharge opening; a pair of rollers extending transversely across said frame adjacent said discharge end thereof and proximate said conveyor, a shaft for each of said rollers, said side walls each having a pair of longitudinally-spaced, vertically-extending slots formed therein with said slots on one of said walls aligned with said slots on the other of said walls, said shafts having their opposed ends journalled for reciprocation and rotation in said aligned slots, a bracket arm extending between and connecting each adjacent pair of ends of said shafts, means connected to one of said bracket arms and to said closure means to effect movement of the latter to open said discharge opening as said rollers move upwardly in response to the presence of forage material on said conveyor, and means connected with said frame and said bracket arm constantly tending to urge said rollers in the opposite direction to cause said closure member to extend across and close said discharge opening in the absence of forage on said conveyor.

2. In the combination defined in claim 1, wherein said last-named means comprises a pair of rods for each of said bracket arms, said rods depending from opposed ends of said bracket arms and being reciprocable through said conveyor frame at opposed sides thereof, a tie bar extending between and connected to the lower ends of each of said pair of rods, and a helicoidal spring surrounding each of said rods and interposed between said frame and said tie bars.

3. In the combination defined in claim 1, wherein said hopper includes a frame, means connecting said frame with said conveyor frame, a shaft extending transversely of said frame and mounted for rotation thereon, a first link connected intermediate its ends on said shaft, a second link having one of its ends pivotally connected with one end of said first link and its other end pivotally connected to said closure means, and resilient means connected with the other end of said first link and said frame to constantly bias said first link for movement to effect the closure of said discharge opening.

References Cited in the file of this patent

UNITED STATES PATENTS

| | | |
|---|---|---|
| 2,668,492 | Schmielewski | Feb. 4, 1954 |
| 2,675,947 | Wynn | Apr. 20, 1954 |
| 2,757,598 | West | Aug. 7, 1956 |
| 2,827,204 | McCurdy | Mar. 18, 1958 |